(12) United States Patent
Perini et al.

(10) Patent No.: US 11,312,488 B2
(45) Date of Patent: Apr. 26, 2022

(54) ROTORCRAFT-CONVERTIBLE MOTORCAR

(71) Applicant: ITALDESIGN-GIUGIARO S.P.A., Turin (IT)

(72) Inventors: Filippo Perini, Moncalieri (IT); Nicola Guelfo, Moncalieri (IT); Enrico Lago, Turin (IT); Nicolas Bussetti, Trofarello (IT)

(73) Assignee: ITALDESIGN-GIUGIARO S.P.A., Turin (IT)

( * ) Notice: Subject to any disclaimer, the term of this patent is extended or adjusted under 35 U.S.C. 154(b) by 309 days.

(21) Appl. No.: 16/631,593

(22) PCT Filed: Jul. 17, 2018

(86) PCT No.: PCT/EP2018/069410
§ 371 (c)(1),
(2) Date: Jan. 16, 2020

(87) PCT Pub. No.: WO2019/016215
PCT Pub. Date: Jan. 24, 2019

(65) Prior Publication Data
US 2020/0164978 A1 May 28, 2020

(30) Foreign Application Priority Data
Jul. 17, 2017 (IT) .................. 102017000080395

(51) Int. Cl.
*B64C 37/00* (2006.01)
*B60F 5/02* (2006.01)
(Continued)

(52) U.S. Cl.
CPC ............ *B64C 37/00* (2013.01); *B62D 61/065* (2013.01); *B64C 27/10* (2013.01); *B60F 5/02* (2013.01); *B64C 1/30* (2013.01)

(58) Field of Classification Search
CPC ......... B64C 37/00; B64C 11/46; B64C 25/02; B64C 25/04; B64C 25/06; B64C 27/08;
(Continued)

(56) References Cited

U.S. PATENT DOCUMENTS 8,292,215 B2 * 10/2012 Olm ...................... B64C 39/024
244/17.23
2003/0094536 A1 * 5/2003 LaBiche ................... B64C 5/12
244/2
(Continued)

FOREIGN PATENT DOCUMENTS

CN 103979107 B * 1/2016
CN 105644283 A * 6/2016
(Continued)

OTHER PUBLICATIONS

International Search Report for International Patent Application No. PCT/EP2018/069410, dated Aug. 29, 2018, 4 pages.

*Primary Examiner* — Joshua J Michener
*Assistant Examiner* — Ryan Andrew Yankey
(74) *Attorney, Agent, or Firm* — Armstrong Teasdale LLP

(57) ABSTRACT

A rotorcraft-convertible motorcar includes a passenger cabin with at least one seat, a pair of front wheels, a central rear wheel, and two pairs of left and right supporting arms located on opposed sides of the passenger cabin, each supporting arm carrying a respective rotor assembly. The supporting arms are pivotally connected to the passenger cabin so that the rotorcraft-convertible car is convertible between an on-road configuration, where the supporting arms with the rotor assemblies are arranged inside a lateral overall size of the passenger cabin, and a flight configuration, where the supporting arms with the rotor assemblies are arranged at least partially outside the overall lateral size of the passenger cabin. The supporting arms and the rotor assemblies are configured so that in the on-road configura- (Continued)

tion the rotor assemblies are accommodated underneath the passenger cabin, on opposed sides of the central rear wheel.

10 Claims, 3 Drawing Sheets

(51) Int. Cl.
    *B64C 1/30*     (2006.01)
    *B64C 27/10*     (2006.01)
    *B62D 61/06*     (2006.01)

(58) Field of Classification Search
    CPC .............. B64C 27/37; B64C 2201/024; B64C 2201/108; B64C 27/50; B64C 11/28; B64C 29/0016; B64C 39/024; B64C 3/56; B64C 1/30; B64C 2201/201; B64C 2201/203; B60F 5/02; B60F 5/003; B62D 61/065

See application file for complete search history.

(56) References Cited

U.S. PATENT DOCUMENTS

| | | | | |
|---|---|---|---|---|
| 2013/0068876 | A1* | 3/2013 | Radu | ........................ B60F 5/02 |
| | | | | 244/2 |
| 2016/0114887 | A1* | 4/2016 | Zhou | .................. H04N 5/23238 |
| | | | | 348/148 |
| 2017/0036771 | A1* | 2/2017 | Woodman | ............... B64C 25/54 |
| 2019/0071178 | A1* | 3/2019 | Caubel | ................. A63H 27/007 |

FOREIGN PATENT DOCUMENTS

| | | | | | |
|---|---|---|---|---|---|
| CN | 105730172 | A | | 7/2016 | |
| CN | 108357313 | A | * | 8/2018 | |
| CN | 108909384 | A | * | 11/2018 | |
| CN | 109263417 | A | * | 1/2019 | |
| CN | 113059969 | A | * | 7/2021 | |
| DE | 102004032166 | A1 | | 1/2006 | |
| RU | 2682756 | C1 | * | 3/2019 | ............. B64D 27/16 |

\* cited by examiner

ROTORCRAFT-CONVERTIBLE MOTORCAR

CROSS-REFERENCE TO RELATED APPLICATIONS

This application is a National Phase filing of PCT International Application No. PCT/EP2018/069410, having an International Filing Date of Jul. 17, 2018, claiming priority to Italian Patent Application No. 102017000080395, having a filing date of Jul. 17, 2017 each of which is hereby incorporated by reference in its entirety.

FIELD OF THE INVENTION

The present invention relates to a rotorcraft-convertible motorcar, that is, a motorcar that can be converted into a rotorcraft, and vice versa, so as to allow passengers to travel both on the ground and in air using the same vehicle.

BACKGROUND OF THE INVENTION

A rotorcraft-convertible motorcar is known, for example, from US 2016/0114887 A1. This known rotorcraft-convertible motorcar comprises a body which encloses a passenger compartment, a front wheel assembly with a pair of front wheels, a rear wheel assembly with a pair of rear wheels, and two pairs of retractable supporting arms located on opposed sides of the body and carrying deployable rotor assemblies, wherein the supporting arms and the rotor assemblies are accommodated, in the closed position (i.e. when the motorcar is configured for travelling on road), in respective seats of the motorcar body placed laterally outwardly of the wheels. Such a known rotorcraft-convertible motorcar is rather bulky, as it requires additional space laterally outwardly of the wheels to accommodate the supporting arms and the rotor assemblies in the on-road configuration of the motorcar.

SUMMARY OF THE INVENTION

It is an object of the present invention to provide a rotorcraft-convertible motorcar that is more compact than the prior art.

A further object of the present invention is to provide a rotorcraft-convertible motorcar that can be easily switched between an on-road configuration and a flight configuration.

These and other objects are fully achieved by a rotorcraft-convertible motorcar as described and claimed herein.

Advantageous embodiments of the present invention are also described.

In short, the invention is based on the idea of providing a rotorcraft-convertible motorcar wherein the rear wheel assembly has a central rear wheel configured either as a single wheel or as a twin-wheel and wherein the supporting arms and the rotor assemblies are configured so that in the on-road configuration the rotor assemblies are accommodated to underneath the passenger cabin, on opposed sides of the central rear wheel.

A rotorcraft-convertible motorcar according to the invention has therefore a structure such that no additional space laterally outwardly of the front wheels is required to accommodate the rotor assemblies in the on-road configuration.

Moreover, a rotorcraft-convertible motorcar according to the invention allows for easy switching from the on-road configuration to the flight configuration and vice versa. Switching from the flight configuration to the on-road configuration is obtained by retracting the supporting arms with the rotor assemblies carried thereon under the passenger cabin by rotation about the respective axes of rotation and by folding the rotor blades of the rotor assemblies in the closed position. On the other hand, switching from the on-road configuration to the flight configuration is obtained by extracting the supporting arms to project laterally outwardly of the passenger cabin and by deploying the rotor blades.

According to an embodiment of the invention, the motorcar has two pairs of left and right supporting arms, namely a first pair of left and right supporting arms that in the flight configuration are arranged on the front side of the passenger cabin and a second pair of left and right supporting arms that in the flight configuration are arranged on the rear side of the passenger cabin.

The left supporting arms of the first and second pairs of supporting arms are hinged to the passenger cabin about a same left axis of rotation, while the right supporting arms of the first and second pairs of supporting arms are hinged to the passenger cabin about a same right axis of rotation.

The supporting arms and the rotor assemblies may be configured so that in the on-road configuration the supporting arms and the blades of the rotor assemblies extend substantially parallel to a central longitudinal plane of the passenger cabin.

According to an embodiment of the invention, each rotor assembly has a pair of coaxial rotor hubs each having respective rotor blades connected thereto. Not only this enhances the lifting capability of each rotor assembly and of the rotorcraft-convertible motorcar as a whole without requiring additional supporting arms, but also helps in balancing the typically unbalanced forces and torques of the rotorcraft within the single arm.

Further features and advantages of the present invention will become apparent from the following detailed description, given purely by way of non-limiting example with reference to the drawings.

DETAILED DESCRIPTION

Figure 1:
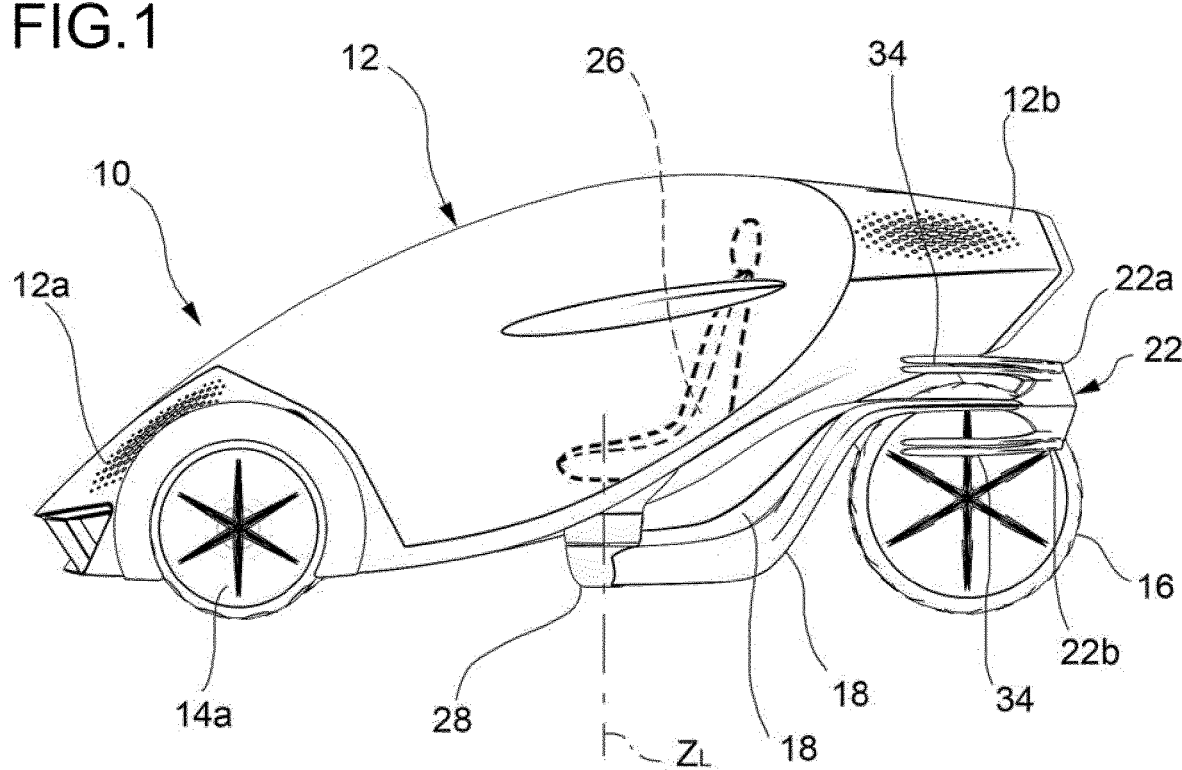
FIGS. 1, 2 and 3 are respectively a lateral view, a rear perspective view and a top view, of a rotorcraft-convertible motorcar according to the present invention, in an on-road configuration.

With reference to the drawings, a rotorcraft-convertible motorcar according to the present invention is generally indicated at 10.

The motorcar 10 is able to switch alternatively between an on-road configuration for travelling on the ground and a flight configuration for travelling in air.

The motorcar 10 may be configured as an autonomous vehicle or as a non-autonomous or semi-autonomous vehicle.

The motorcar 10 basically comprises a passenger cabin 12, a front wheel assembly having a left front wheel 14*a* and a right front wheel 14*b*, a rear wheel assembly having a central rear wheel 16, and at least one pair of left and right supporting arms 18 and 20 carrying respective rotor assemblies 22 and 24.

The passenger cabin 12 encloses a passenger compartment where at least one seat 26 is arranged for accommodating at least one passenger on board of the motorcar.

The passenger cabin 12 comprises a front portion 12a carrying the front wheels 14a and 14b, and a rear portion 12b carrying the rear wheel 16.

Figure 3:
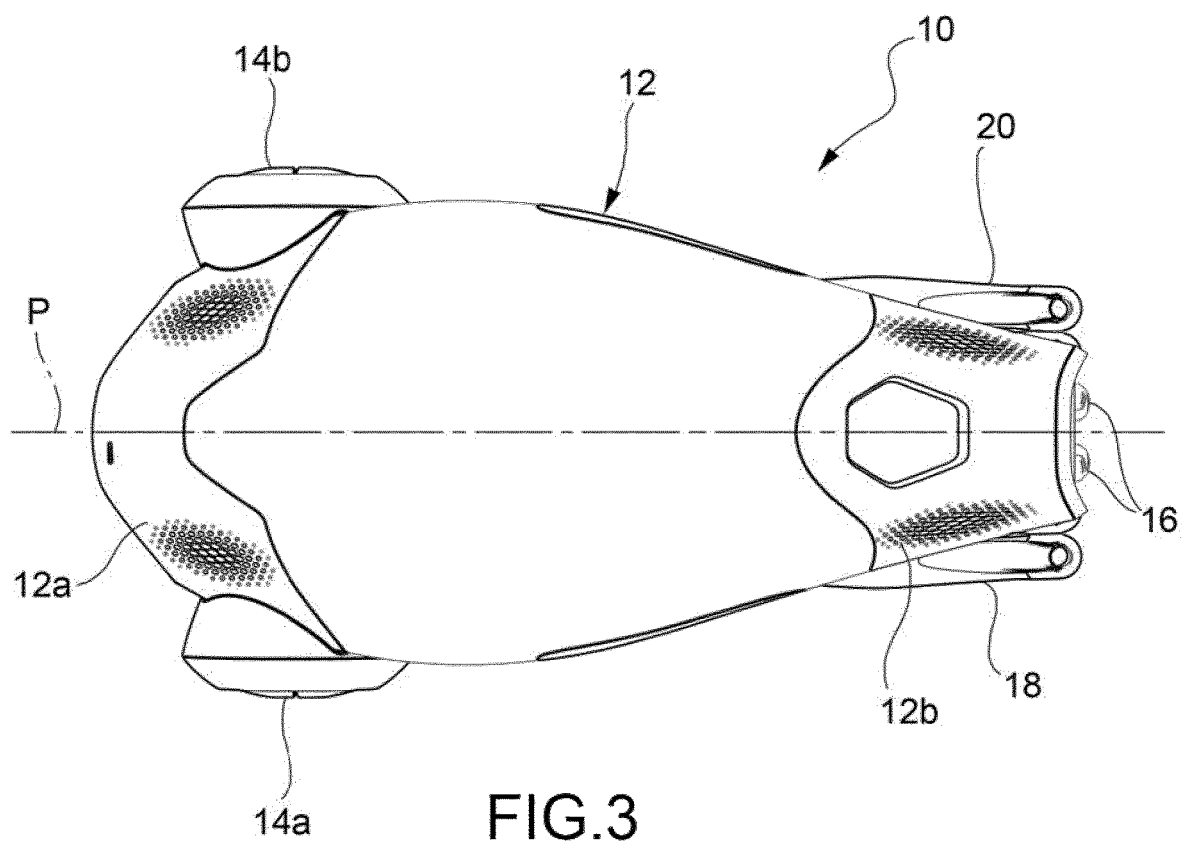
Figure 4:
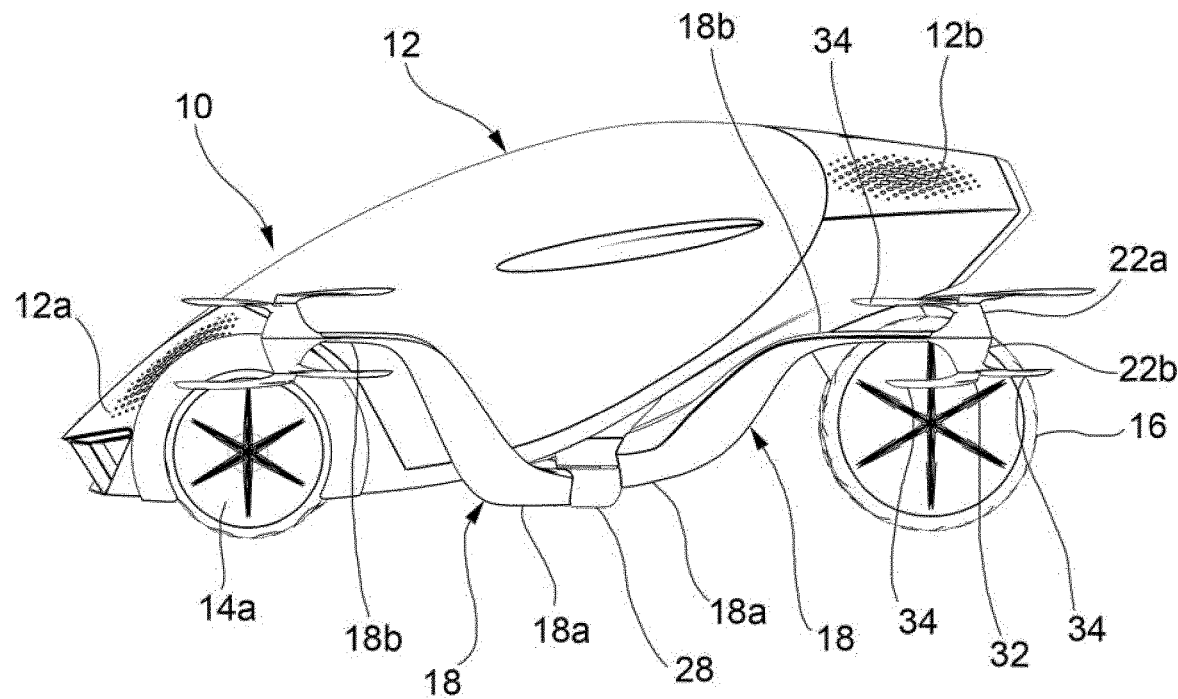
FIGS. 4, 5 and 6 are respectively a lateral view, a front perspective view and a top view, of the rotorcraft-convertible motorcar of FIGS. 1 to 3, in a flight configuration.
Figure 5:
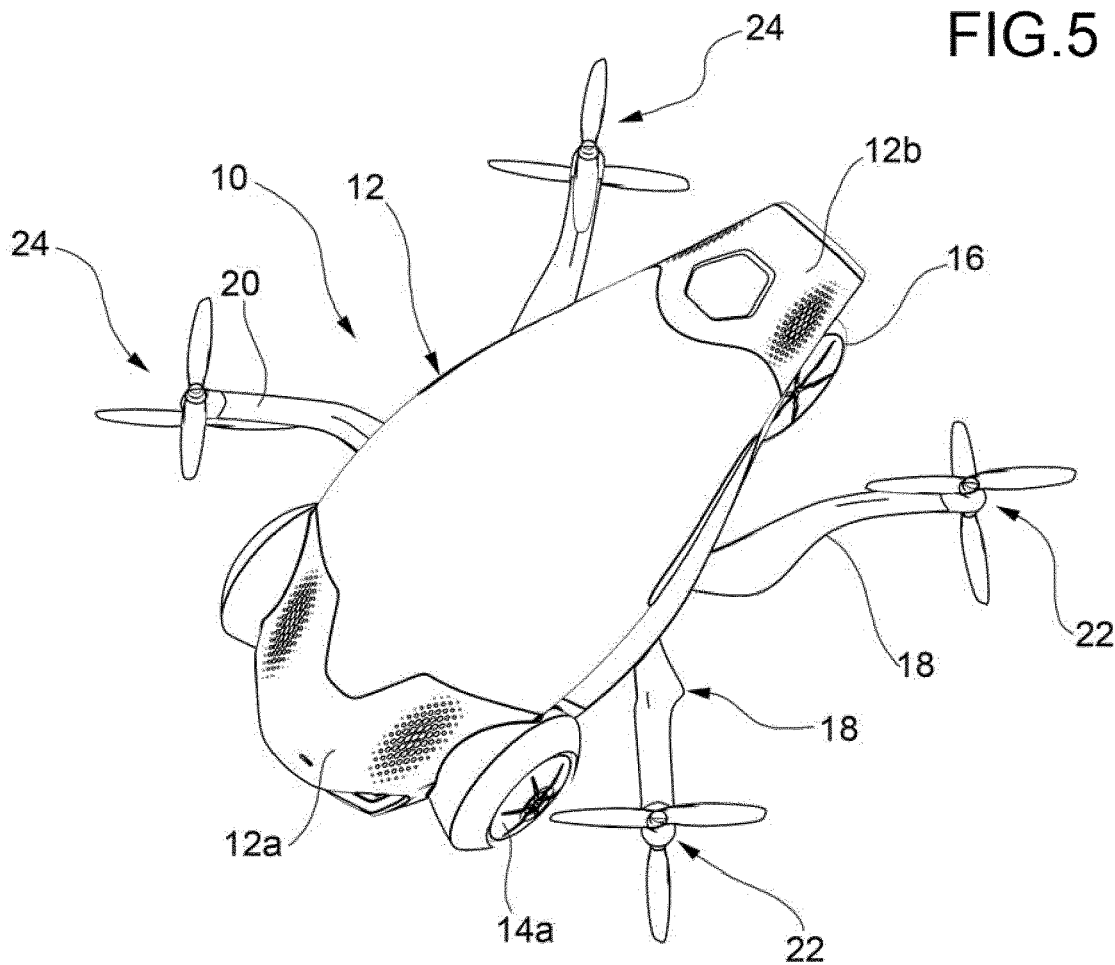

The floor of the rear portion 12b of the passenger cabin 12 is raised with respect to the floor of the front portion 12a, as can be seen in FIG. 1, i.e. it is placed at a greater height to the ground than the floor of the front portion 12a. Moreover, the rear portion 12b of the passenger cabin 12 has a smaller lateral size than the front portion 12a, as clearly shown in FIG. 3.

The left and right front wheels 14a and 14b are placed on respective sides of the passenger cabin 12 with respect to a central longitudinal plane (indicated P in FIGS. 3 and 6) of the passenger cabin 12. The central rear wheel 16 of the illustrated embodiment is a twin-wheel, but it may also be a single wheel.

Figure 6:
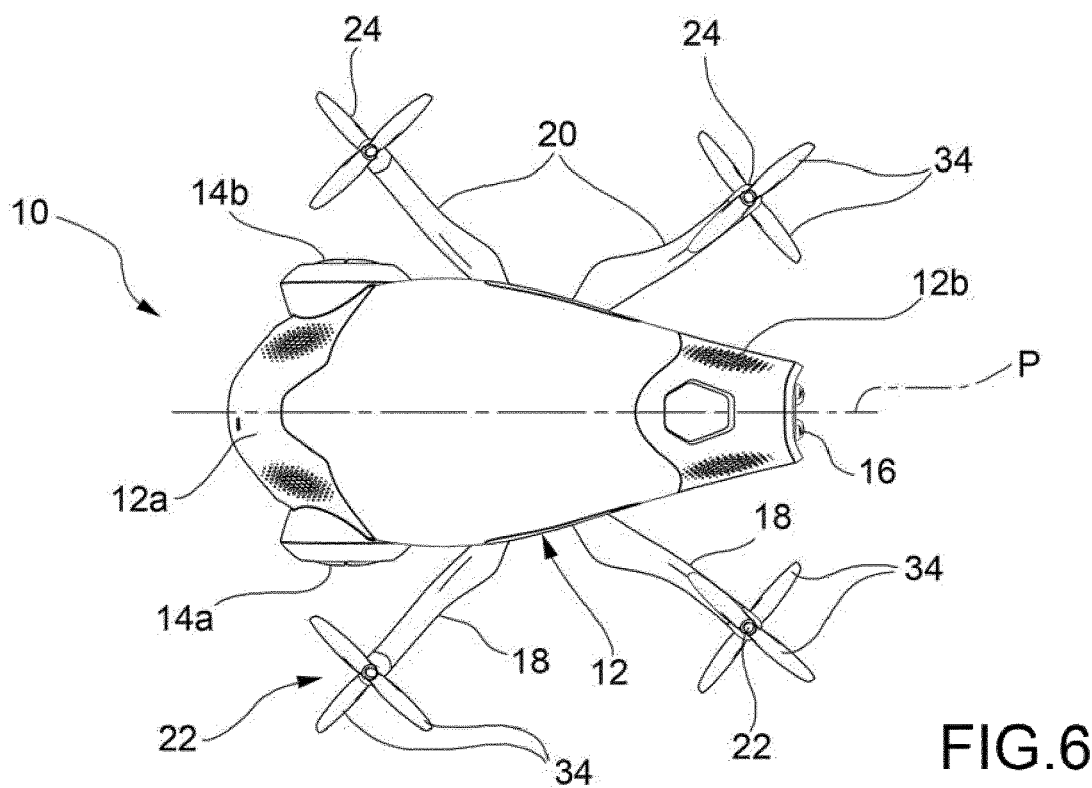

In the illustrated embodiment, the motorcar 10 comprises two pairs of left and right supporting arms 18 and 20, namely a first pair of left and right supporting arms 18 and 20 that in the flight configuration are arranged on the front side of the passenger cabin 12 and a second pair of left and right supporting arms 18 and 20 that in the flight configuration are arranged on the rear side of the passenger cabin 12 (see FIG. 6).

Each supporting arm 18 and 20 is pivotally connected at a proximal end 18a and 20a to the passenger cabin 12 for rotation about a respective axis of rotation (which is substantially vertically oriented) relative to the passenger cabin 12. In the illustrated embodiment, the left supporting arms 18 of the first and second pairs of supporting arms are hinged to the passenger cabin 12 about a same axis of rotation $z_L$, hereinafter referred to as left axis of rotation, while the right supporting arms 20 of the first and second pairs of supporting arms are hinged to the passenger cabin 12 about a same axis of rotation $z_R$, hereinafter referred to as right axis of rotation.

The supporting arms 18 and 20 are pivotally connected to the passenger cabin 12 through respective connection hinges 28 and 30, which are placed underneath the floor of the passenger cabin 12 at a location between the front portion 12a and the rear portion 12b of the passenger cabin.

In the illustrated embodiment, the left supporting arms 18 are pivotally connected to the passenger cabin 12 through the same connection hinge 28. Likewise, the right supporting arms 20 are pivotally connected to the passenger cabin 12 through the same connection hinge 30.

Each supporting arm 18 and 20 carries the respective rotor assembly 22 and 24 at a distal end thereof, indicated 18b and 20b for the left supporting arms 18 and the right supporting arms 20, respectively.

In the illustrated embodiment, the distal ends 18b and 20b of the supporting arms 18 and 20 are raised with respect to the proximal ends 18a and 20a, so that the rotor assemblies 22 and 24 are placed above a plane passing through the axes of rotation $x_F$ and $x_R$ the front wheels 14a, 14b and of the rear wheel 16, respectively.

The supporting arms 18 and 20 are rotatable about the respective axes of rotation $z_L$ and $Z_R$ between an extended position (corresponding to the flight configuration of the motorcar) and a retracted position (corresponding to the on-road configuration of the motorcar).

In the extended position, the supporting arms 18 and 20 are at least partially outside the overall lateral size of the passenger cabin 12, wherein the term "overall lateral size" is intended here to indicate the maximum width of the passenger cabin, corresponding to the distance from the farthest point of the left front wheel 14a with respect to the central longitudinal plane P to the farthest point of the right front wheel 14b with respect to the central longitudinal plane P.

In the retracted position, the supporting arms 18 and 20 are both facing rearwards and oriented substantially parallel to the central longitudinal plane P of the passenger cabin 12, so that the rotor assemblies 22 and 24 are accommodated underneath the passenger cabin 12, on opposed sides of the rear wheel 16.

The supporting arms 18 and 20 are shaped so that in the retracted position the two left supporting arms 18 at least partially overlap each other and the rotor assemblies 22 carried by the these supporting arms are arranged side-by-side on the left side of the rear wheel 16, while the right supporting arms 20 at least partially overlap each other and the rotor assemblies 24 carried by these supporting arms are arranged side-by-side on the right side of the rear wheel 16.

Each rotor assembly 22, 24 comprises at least one rotor, preferably—as in the illustrated embodiment—two rotors 22a, 24a and 22b, 24b, that is to say, an upper rotor 22a and a lower rotor 22b for each of the rotor assemblies 22 carried by the left supporting arms 18 and an upper rotor 24a and a lower rotor 24b for each of the rotor assemblies 24 carried by the right supporting arms 20. The upper and lower rotors 22a, 22b of the rotor assemblies 22 are arranged coaxially to each other, on opposed sides of the distal ends 18b of the left supporting arms 18, and are preferably driven to rotate in opposite directions relative to each other. Likewise, the upper and lower rotors 24a, 24b of the rotor assemblies 24 are arranged coaxially to each other, on opposed sides of the distal ends 20b of the right supporting arms 20, and are also preferably driven to rotate in opposite directions relative to each other.

Each rotor 22a, 24a, 22b and 24b comprises a rotor hub 32 and a set of rotor blades 34 (preferably at least four rotor blades 34) attached at their radially inner ends to the rotor hub 32. The rotor blades 34 are configured as deployable blades and are thus equipped with mechanisms (not shown, but of per-se-known type) for moving the rotor blades 34 with respect to each other between a working position and a non-working position. In the working position, the rotor blades 28 are fully deployed and are substantially angularly equally spaced from each other. In the non-working position, the rotor blades 34 fully overlap each other or, more generally, at least partially overlap each other. In the illustrated embodiment, in the flight configuration of the motorcar 10 the rotor blades 34 extend substantially parallel to the central longitudinal plane P of the passenger cabin 12, like the supporting arms 18 and 20.

The rotors 22a, 24a and 22b, 24b of the rotor assemblies 22 and 24 may be configured as tilting rotors, in order to guarantee manoeuvrability in some or all directions to the motorcar 10 in the flight configuration. Furthermore, the rotor assemblies 22 and 24 may be provided with conventional controls (cyclic pitch control, collective pitch control, etc.).

An electronic control unit (not shown) of the motorcar controls, on the basis for example of control inputs provided by the driver, movement of the supporting arms 18 and 20 between the extended and retracted positions as well as movement of the rotor blades 34 between the working and space-saving positions.

Figure 2:
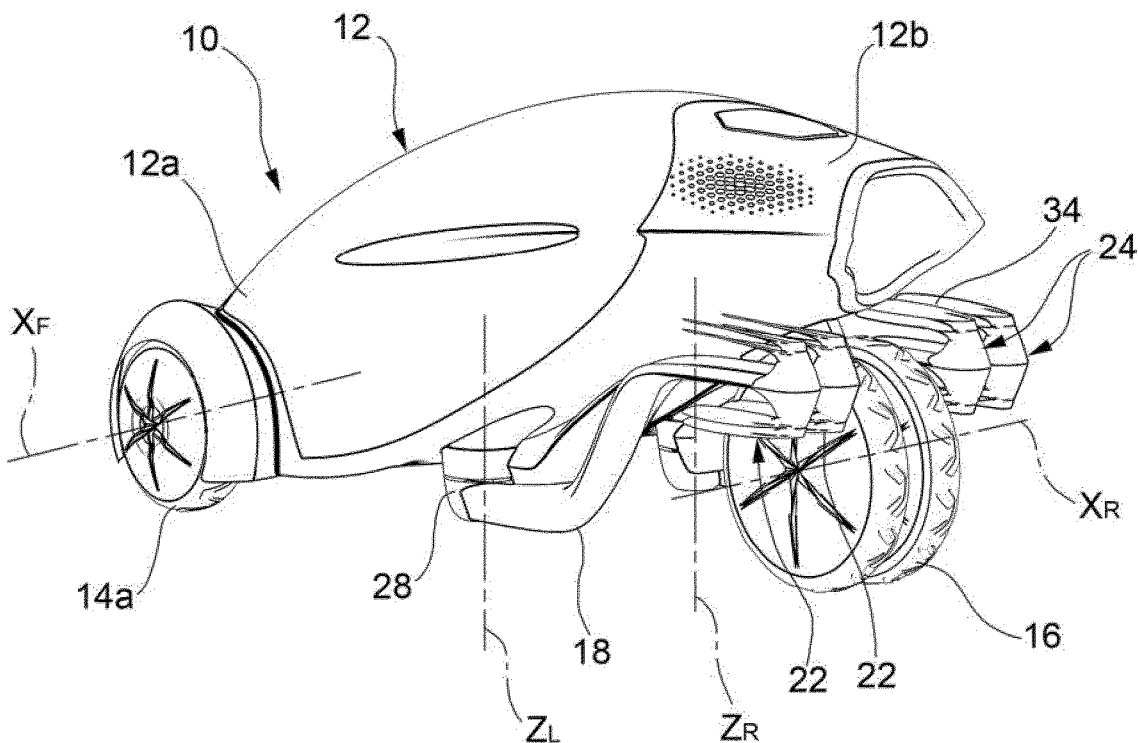

As already mentioned above, the motorcar 10 is switchable between an on-road configuration (FIGS. 1 to 3), where the supporting arms 18 and 20 are in the retracted position and the rotor blades 34 are in the non-working position, and a flight configuration, where the supporting arms 18 and 20 are in the extended position and the rotor blades 34 are in the working position.

Thanks to the arrangement of the rotor assemblies 22 and 24, in the on-road configuration of the motorcar 10, beneath the rear portion 12b of the passenger cabin 12 on opposed sides of the central rear wheel 16, the motorcar of the present invention has a more compact structure than the prior art. More specifically, the motorcar of the present invention does not require additional lateral space for accommodating the supporting arms 18 and 20 with the respective rotor assemblies 22 and 24 in the on-road configuration.

The principle of the invention remaining unchanged, the embodiments and the constructional details may vary widely from those described and illustrated by way of non-limiting example, without thereby departing from the scope of the invention as described herein.

What is claimed is:

1. A rotorcraft-convertible motorcar comprising:
a passenger cabin comprising at least one seat,
a front wheel assembly with a left front wheel and a right front wheel and a rear wheel assembly, and
at least one pair of left and right supporting arms located on opposed sides of the passenger cabin with respect to a central longitudinal plane of the passenger cabin, each supporting arm carrying a respective rotor assembly having at least one rotor,
wherein each rotor comprises a rotor hub and a plurality of deployable rotor blade connected to the rotor hub,
wherein the left and right supporting arms are pivotally connected to the passenger cabin so that the rotorcraft-convertible motorcar car is convertible between an on-road configuration, where the left and right supporting arms with the rotor assemblies are arranged inside a lateral overall size of the passenger cabin, and a flight configuration, where the left and right supporting arms with the rotor assemblies are arranged at least partially outside the overall lateral size of the passenger cabin,
wherein the rear wheel assembly has a central rear single- or twin-wheel, and
wherein the left and right supporting arms and the rotor assemblies are configured so that in the on-road configuration the rotor assemblies are accommodated underneath the passenger cabin, on opposed sides of the central rear single- or twin-wheel.

2. The rotorcraft-convertible motorcar of claim 1, wherein the left and right supporting arms and the rotor assemblies are configured so that in the on-road configuration the left and right supporting arms and the deployable rotor blades of the rotor assemblies extend substantially parallel to the central longitudinal plane.

3. The rotorcraft-convertible motorcar of claim 1, comprising two pairs of left and right supporting arms, including a first pair of left and right supporting arms that in the flight configuration are arranged on a front side of the passenger cabin and a second pair of left and right supporting arms that in the flight configuration are arranged on a rear side of the passenger cabin.

4. The rotorcraft-convertible motorcar of claim 3, wherein the left supporting arms of the first and second pairs of left and right supporting arms are hinged to the passenger cabin about a same left axis of rotation ($z_L$) while the right supporting arms of the first and second pairs of left and right supporting arms are hinged to the passenger cabin about a same right axis of rotation ($z_R$).

5. The rotorcraft-convertible motorcar of claim 3, wherein the left and right supporting arms are shaped so that in the on-road configuration the left supporting arms arc at least partially overlap each other and the rotor assemblies carried by the left supporting arms are arranged side-by-side, and wherein the right supporting arms at least partially overlap each other and the rotor assemblies carried by the right supporting arms are arranged side-by-side.

6. The rotorcraft-convertible motorcar of claim 1, wherein each rotor assembly comprises first and second rotors, the rotor hub of the first rotor being coaxial to the rotor hub of the second rotor.

7. The rotorcraft-convertible motorcar of claim 1, wherein a rear portion of the passenger cabin carrying the rear wheel assembly is raised with respect to a front portion of the passenger cabin carrying the front wheel assembly, the rotor assemblies being arranged beneath the rear portion of the passenger cabin when the rotorcraft-convertible motorcar is in the on-road configuration.

8. The rotorcraft-convertible motorcar of claim 7, wherein the rear portion of the passenger cabin has a smaller lateral size than the front portion of the passenger cabin.

9. The rotorcraft-convertible motorcar of claim 1, wherein each supporting arm has a proximal end pivotally connected to the passenger cabin and a distal end carrying the rotor assembly, the distal end being raised with respect to the proximal end.

10. The rotorcraft-convertible motorcar of claim 1, wherein the rotor assemblies are placed above a plane passing through axes of rotation ($x_F$, $x_R$) of the front wheel assembly and of the rear wheel assembly.

* * * * *